April 5, 1960            F. J. POTTER            2,931,980
TEST SET TO MEASURE DYNAMIC PROPERTIES OF DIODES
Filed July 3, 1958
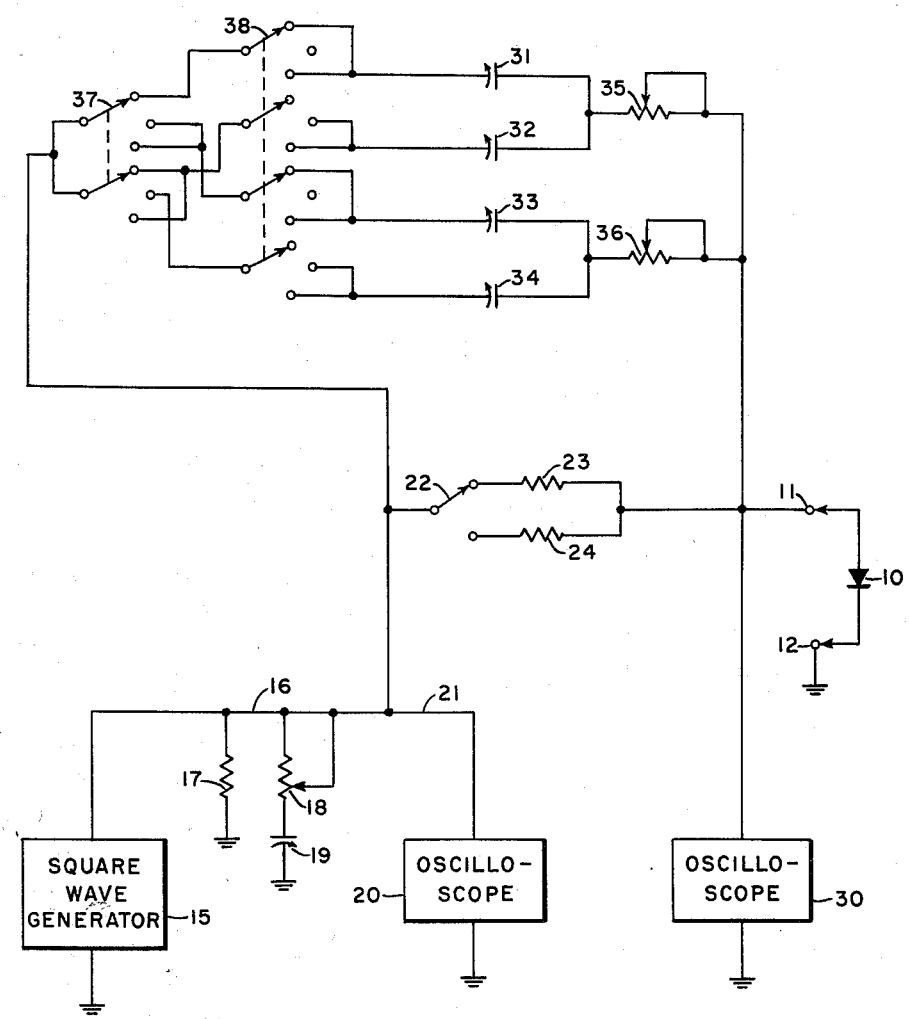
INVENTOR.
FRANK J. POTTER
BY
ATTORNEY

United States Patent Office 2,931,980
Patented Apr. 5, 1960

2,931,980

TEST SET TO MEASURE DYNAMIC PROPERTIES OF DIODES

Frank J. Potter, Penfield, N.Y., assignor to General Dynamics Corporation, Rochester, N.Y., a corporation of Delaware Application July 3, 1958, Serial No. 746,546

11 Claims. (Cl. 324—158)

This invention relates to electrical testing circuits and, more particularly, to circuits for testing passive types of electronic components such as germanium diodes, silicon diodes, selenium rectifiers, copper oxide rectifiers, and so forth.

A passive type of electronic component, such as a germanium or silicon diode, is becoming more and more valuable for use in electronic circuits that require the diode to be switched from conductive to non-conductive conditions at high speeds. In fact, some of the circuit applications require the switching of the diode in such a short period of time as to cause certain inherent characteristics of the diode, formerly not considered to be of particular importance, to become quite important in determining the high speed limit with which the diode can be switched. For example, it is known that diode elements of the type mentioned acquire a charge of electricity during their operation in the conductive state, sometimes referred to as forward direction, and also that these diodes have a certain amount of resistance to the discharge of the acquired charge when the diode is switched back from the conductive to the non-conductive state, i.e., from the forward to the reverse direction. Since the diode cannot be considered as completely switched from the forward to the reverse direction until the acquired charge is completely dissipated with reference to the circuit in which the diode may be operated, and since this charge acquiring characteristic and the resistance to discharge of the acquired charge may vary with each diode used, it is important to know what these characteristics of a particular diode are. Also, it may be desirable to ascertain that all diodes of a tested group satisfy a condition in which their charge acquiring abilities and their resistance to the discharge of the acquired charge are not greater than predetermined amounts.

Therefore, a principal object of the invention is to provide a simplified testing circuit for determining the charge acquiring ability of a diode when operated in the forward direction.

Another object of the invention is to provide a simplified electrical circuit for determining the resistance of a diode with reference to the discharge of a charge acquired by the diode during its operation in the forward direction.

Yet another object of the invention is to provide a simplified electrical circuit for indicating both the amount of charge acquired by a diode under test when operated in the forward direction and the resistance of a diode under test to discharge the charge acquired in the forward direction when the diode is switched to the reverse direction.

Yet another object of the invention is to provide a simplified electrical circuit which may provide a visual display of the charge acquiring characteristic and the discharge characteristic of a diode under test so that diodes to be tested may be quickly identified as having more or less than predetermined limits of characteristics.

Further objects, features, and the attendant advantages of the invention will become apparent with reference to the following specification and drawing in which the single figure is a schematic diagram.

Referring to the drawing, a diode under test is indicated at 10 and it is understood that terminals 11 and 12 are provided to enable the quick attachment and detachment of the diode under test. A source of current to be applied to the diode 10 under test with a voltage and polarity to enable the diode to conduct in the forward direction is indicated at 15, and this source of current may be preferably a square wave generator or some other source of voltage pulses having well defined patterns of voltage excursions with extremely short decay time for each pulse. The generator is connected to the test unit by the ground path, indicated by the conventional ground symbol, and by the conductor 16 having in parallel therewith a resistance 17, an adjustable resistance 18, and an adjustable capacitance 19 in order that the impedance of the connecting conductor 16 may be exactly balanced to the output impedance of the source 15 thus minimizing undesired reflections. The voltage pattern of the source 15 may be readily indicated by an oscilloscope 20 connected to the conductor 21 and the conductor 16 and ground.

The voltage signal passed by the conductor 16 is connected by a single-pole double-throw switch 22 through either a series resistance 23 or a series resistance 24 to the terminal 11 and the diode 10 under test. Thus, whenever the applied voltage assumes sufficient magnitude with a positive polarity, the diode 10 will conduct and a voltage drop will appear across either the resistor 23 or 24 depending upon the position of the switch 22. Resistor 24 may be a larger resistor than resistor 23 and, in effect, is a range resistance to determine the amount of voltage drop proportional to the current flow in the forward direction through the diode 10 under test. Obviously, in place of the selector switch 22 and the fixed resistors 23 and 24 a variable resistance may be substituted for determining the range of voltage drop proportional to the current flow through the diode.

A second oscilloscope 30 is connected in parallel with the diode 10 to display the pattern of voltage across the diode 10 under the dynamic conditions of operation at all times while the pattern of pulse voltage is continuously applied. With the arrangement thus far described, it will be observed by comparing the displays of oscilloscopes 20 and 30 that the pattern of voltage across the diode 10 is not an exact replica of the pattern of voltage across the generator source 15. This is due to the fact that the diode 10 acquires a charge during its conduction in the forward direction and also to the fact that this charge is not immediately dissipated when the diode is switching during the decay of the applied voltage due to the resistance of the diode to the discharge of the acquired charge. Also, as previously mentioned, each diode under test may have a varying capacity to acquire a charge and a varying resistance to the discharge of the acquired charge so that the voltage pattern displayed by the oscilloscope 30 with reference to the voltage pattern displayed by the oscilloscope 20 may be different for each diode tested. The test circuit of the invention provides for the connection of a calibrated capacitance and a calibrated resistance in series with each other and in parallel to the range resistance 23 or 24. The voltage developed across the range resistance 23 or 24 during the conduction of the diode 10 under test will therefore effect a charging of the calibrated capacitor. In practice, the calibrated capacitor is adjustable with a series of calibrated capacitance units 31, 32, 33, and 34 while the calibrated resistance is provided by a series of two adjustable units 35 and 36. The selector switches 37 and 38 are provided to select various combinations of the calibrated resistors and capacitors to provide the necessary range.

I have found that when the calibrated capacitance and the calibrated resistance are properly adjusted to store an amount of charge equal to the amount of charge acquired by the diode during its conduction in the forward direction and to provide a resistance to the discharge of the acquired charge equal to the resistance of the diode to discharge its acquired charge, then the pattern of voltage displayed on the oscilloscope 30 will be substantially identical to the pattern displayed on the oscilloscope 20. This is believed to be due to the fact that the discharge of the energy acquired by the calibrated capacitor through the calibrated resistor is of opposite polarity to and opposes the discharge of current acquired in the diode 10 under test during the time the diode is switching from the forward to the reverse direction, assuming that the calibrated resistance is adjusted to be substantially the same as the resistance of the diode to the discharge of the acquired charge. Thus, by reading the value of the adjustable calibrated capacitor and the value of the adjustable calibrated resistor, after the patterns on the oscilloscopes 20 and 30 are essentially the same, the equivalent values of the dynamic characteristics of the diode 10, namely, its charge acquiring characteristic and its resistance to the discharge of the acquired voltage, are determined.

A simplified procedure for using the test circuit of the invention for separating a group of diodes into a first group having less than maximum charge acquiring capacity and resistance to discharge of the acquired charge, and a second group having more than the maximum dynamic characteristics would be as follows. The adjustable calibrated capacitor is adjusted to the maximum allowable capacity value and the adjustable calibrated resistor is adjusted to the maximum allowable resistance. Thereafter, each diode tested will display a particular pattern on the oscilloscope 30. If the pattern displayed should indicate a voltage of positive polarity greater than zero during the time after the decay of each square wave pulse and before the application of the next square wave pulse, then it may be assumed that the particular diode under test has either greater capacity to store charge than the maximum allowable value or a slower discharge of the acquired charge than the maximum allowable value, or both. Thus, an unskilled operator can very quickly and easily separate diodes under test into the aforementioned two groups.

Considering the invention as described, it will now be realized that the test arrangement is concerned primarily with the pattern of the trailing edge of each voltage pulse applied to the diode or, in other words, is concerned with the pattern of voltage across the diode at the time that the diode is switching from its forward direction to its reverse direction. The test circuit of the invention makes no attempt to determine dynamic characteristics of the diode under test when switching from the reverse to the forward direction.

It should also be obvious that the choice of component values for a given test circuit may vary over a wide range depending upon the type of diode under test and that such choice of values should now be obvious to anyone skilled in the art and, therefore, it would be relatively meaningless to assign component values for the various resistors, capacitors, and other electronic elements referred to in the circuit description. Also, it should be understood that in place of the cathode ray oscilloscope display tubes 20 and 30, other types of voltage indicating devices which would indicate continuously the variations in voltage across the respective source of current and diode under test could be used.

The invention has been specifically described with reference to its ability to measure and indicate certain dynamic characteristics of diodes. However, the invention may be also applied to measuring similar characteristics of other types of solid element electronic components such as transistors or the like. It is known that transistors have similar charge acquiring abilities between various ones of their respective electrodes and the principles of the invention may be accordingly applied to determine these characteristics of transistors.

Various other modifications will occur to those skilled in the art within the spirit of the invention and the scope of the appended claims.

What is claimed is:

1. A test circuit for measuring diode dynamic characteristics such as the amount of charge stored in a diode for discharge during the recovery time of the diode and the amount of diode resistance to the discharge of the stored charge comprising, a source of current, means to intermittently connect said source to a diode under test to intermittently conduct said current through the diode in the forward direction, a first resistor connected in series with said source and the diode under test, and adjustable calibrated capacitor, an adjustable calibrated resistor, means to connect said calibrated capacitor and said calibrated resistor in series with each other and in shunt to said first resistor, and means to continuously indicate the voltage in parallel with said diode whereby it may be determined that the voltage across said diode drops to zero in the same time that the voltage of the current intermittently connected from said source to said diode drops to zero upon a given adjustment of said calibrated capacitor and calibrated resistor to thus indicate the equivalent dynamic charge and resistance characteristics of the diode under test.

2. A test circuit for measuring diode dynamic characteristics such as the amount of charge stored in a diode for discharge during the recovery time of the diode and the amount of diode resistance to the discharge of the stored charge comprising, a source of current, means to intermittently connect said source to a diode under test to intermittently conduct said current through the diode in the forward direction, a first adjustable resistor connected in series with said source and the diode under test, an adjustable calibrated capacitor, an adjustable calibrated resistor, means to connect said calibrated capacitor and said calibrated resistor in series with each other and in shunt to said first resistor, and means to continuously indicate the voltage in parallel with said diode whereby it may be determined that the voltage across said diode drops to zero in the same time that the voltage of the current intermittently connected from said source to said diode drops to zero upon a given adjustment of said calibrated capacitor and calibrated resistor to thus indicate the equivalent dynamic charge and resistance characteristics of the diode under test.

3. A test circuit for measuring diode dynamic characteristics such as the amount of charge stored in a diode for discharge during the recovery time of the diode and the amount of diode resistance to the discharge of the stored charge comprising, a source of current, means to intermittently connect said source to a diode under test to intermittently conduct said current through the diode in the forward direction, a first resistor connected in series with said source and the diode under test, an adjustable calibrated capacitor, an adjustable calibrated resistor, means to connect said calibrated capacitor and said calibrated resistor in series with each other and in shunt to said first resistor, and oscilloscope means to continuously indicate the voltage in parallel with said diode whereby it may be determined that the voltage across said diode drops to zero in the same time that the voltage of the current intermittently connected from said source to said diode drops to zero upon a given adjustment of said calibrated capacitor and calibrated resistor to thus indicate the equivalent dynamic charge and resistance characteristics of the diode under test.

4. A test circuit for measuring diode dynamic characteristics such as the amount of charge stored in a diode for discharge during the recovery time of the diode and the amount of diode resistance to the discharge of the stored charge comprising, a source of current, means to intermittently connect said source to a diode under test to intermittently conduct said current through the diode in the forward direction, a first adjustable resistor connected in series with said source and the diode under test, an adjustable calibrated capacitor, an adjustable calibrated resistor, means to connect said calibrated capacitor and said calibrated resistor in series with each other and in shunt to said first resistor, and oscilloscope means to continuously indicate the voltage in parallel with said diode whereby it may be determined that the voltage across said diode drops to zero in the same time that the voltage of the current intermittently connected from said source to said diode drops to zero upon a given adjustment of said calibrated capacitor and calibrated resistor to thus indicate the equivalent dynamic charge and resistance characteristics of the diode under test.

5. A test circuit for measuring diode dynamic characteristics such as the amount of charge stored in a diode for discharge during the recovery time of the diode and the amount of diode resistance to the discharge of the stored charge comprising, a generator source of voltage pulses having short decay time, means to intermittently connect said generator to a diode under test to conduct pulses of current through the diode in the forward direction, a first resistor connected in series with said generator and the diode under test, an adjustable calibrated capacitor, an adjustable calibrated resistor, means to connect said calibrated capacitor and said calibrated resistor in series with each other and in shunt to said first resistor, and means to continuously indicate the voltage in parallel with said diode whereby it may be determined that the voltage across said diode drops to zero in the same time that the voltage of the pulses connected from said generator to said diode drops to zero upon a given adjustment of said calibrated capacitor and calibrated resistor to thus indicate the equivalent dynamic charge and resistance characteristics of the diode under test.

6. A test circuit for measuring diode dynamic characteristics such as the amount of charge stored in a diode for discharge during the recovery time of the diode and the amount of diode resistance to the discharge of the stored charge comprising, a generator source of voltage pulses having short decay time, means to intermittently connect said generator to a diode under test to conduct pulses of current through the diode in the forward direction, a first adjustable resistor connected in series with said generator and the diode under test, an adjustable calibrated capacitor, an adjustable calibrated resistor, means to connect said calibrated capacitor and said calibrated resistor in series with each other and in shunt to said first resistor, and means to continuously indicate the voltage in parallel with said diode whereby it may be determined that the voltage across said diode drops to zero in the same time that the voltage of the pulses connected from said generator to said diode drops to zero upon a given adjustment of said calibrated capacitor and calibrated resistor to thus indicate the equivalent dynamic charge and resistance characteristics of the diode under test.

7. A test circuit for measuring diode dynamic characteristics such as the amount of charge stored in a diode for discharge during the recovery time of the diode and the amount of diode resistance to the discharge of the stored charge comprising, a generator source of voltage pulses having short decay time, means to intermittently connect said generator to a diode under test to conduct pulses of current through the diode in the forward direction, a first resistor connected in series with said generator and the diode under test, an adjustable calibrated capacitor, an adjustable calibrated resistor, means to connect said calibrated capacitor and said calibrated resistor in series with each other and in shunt to said first resistor, and oscilloscope means to continuously indicate the voltage in parallel with said diode whereby it may be determined that the voltage across said diode drops to zero in the same time that the voltage of the pulses connected from said generator to said diode drops to zero upon a given adjustment of said calibrated capacitor and calibrated resistor to thus indicate the equivalent dynamic charge and resistance characteristics of the diode under test.

8. A test circuit for measuring diode dynamic characteristics such as the amount of charge stored in a diode for discharge during the recovery time of the diode and the amount of diode resistance to the discharge of the stored charge comprising, a generator source of voltage pulses having short decay time, means to intermittently connect said generator to a diode under test to conduct pulses of current through the diode in the forward direction, a first adjustable resistor connected in series with said generator and the diode under test, an adjustable calibrated capacitor, an adjustable calibrated resistor, means to connect said calibrated capacitor and said calibrated resistor in series with each other and in shunt to said first resistor, and oscilloscope means to continuously indicate the voltage in parallel with said diode whereby it may be determined that the voltage across said diode drops to zero in the same time that the voltage of the pulses connected from said generator to said diode drops to zero upon a given adjustment of said calibrated capacitor and calibrated resistor to thus indicate the equivalent dynamic charge and resistance characteristics of the diode under test.

9. A test circuit for measuring diode dynamic characteristics such as the amount of charge stored in a diode for discharge during the recovery time of the diode and the amount of diode resistance to the discharge of the stored charge comprising, a generator source of voltage pulses having short decay time, means to intermittently connect said generator to a diode under test to conduct pulses of current through the diode in the forward direction, a first resistor connected in series with said generator and the diode under test, an adjustable calibrated capacitor, an adjustable calibrated resistor, means to connect said calibrated capacitor and said calibrated resistor in series with each other and in shunt to said first resistor, means to display the pattern of voltage across said source, and means to display the pattern of voltage across said diode whereby it may be determined that the voltage across said diode drops to zero in the same time that the voltage of the pulses connected from said generator to said diode drops to zero upon a given adjustment of said calibrated capacitor and calibrated resistor to thus indicate the equivalent dynamic charge and resistance characteristics of the diode under test.

10. A test circuit for measuring diode dynamic characteristics such as the amount of charge stored in a diode for discharge during the recovery time of the diode and the amount of diode resistance to the discharge of the stored charge comprising, a source of current, means to intermittently connect said source to a diode under test to intermittently conduct said current through the diode in the forward direction, a first adjustable resistor connected in series with said source and the diode under test, an adjustable calibrated capacitor, an adjustable calibrated resistor, means to connect said calibrated capacitor and said calibrated resistor in series with each other and in shunt to said first resistor, means to display the pattern of voltage across said source, and means to display the pattern of voltage across said diode whereby it may be determined that the voltage across said diode drops to zero in the same time that the voltage of the current intermittently connected from said source to said diode drops to zero upon a given adjustment of said calibrated capacitor and calibrated resistor to thus indicate the equivalent dynamic charge and resistance characteristics of the diode under test.

11. A test circuit for measuring diode dynamic characteristics such as the amount of charge stored in a diode for discharge during the recovery time of the diode and the amount of diode resistance to the discharge of the stored charge comprising, a source of current, means to intermittently connect said source to a diode under test to intermittently conduct said current through the diode in the forward direction, a first resistor connected in series with said source and the diode under test, a calibrated capacitor, a calibrated resistor, means to connect said calibrated capacitor and said calibrated resistor in series with each other and in shunt to said first resistor, and means to continuously indicate the voltage in parallel with said diode whereby it may be determined that the voltage across said diode drops to zero in the same time that the voltage of the current intermittently connected from said source to said diode drops to zero for a given value of said calibrated capacitor and calibrated resistor to thus indicate the equivalent dynamic charge and resistance characteristics of the diode under test.

References Cited in the file of this patent

"Recovery Time Measurements on Point Contact Germanium Diodes," Proceedings of the I.R.E., May 1955, pp. 603–607.